United States Patent
Subramaniyan et al.

(10) Patent No.: US 9,534,536 B2
(45) Date of Patent: Jan. 3, 2017

(54) TURBINE FLOW MODULATION FOR PART LOAD PERFORMANCE

(71) Applicant: General Electric Company, Schenectady, NY (US)

(72) Inventors: Moorthi Subramaniyan, Karnataka (IN); Joshy John, Karnataka (IN)

(73) Assignee: GENERAL ELECTRIC COMPANY, Schenectady, NY (US)

(*) Notice: Subject to any disclaimer, the term of this patent is extended or adjusted under 35 U.S.C. 154(b) by 855 days.

(21) Appl. No.: 13/933,201

(22) Filed: Jul. 2, 2013

(65) Prior Publication Data

US 2015/0010382 A1    Jan. 8, 2015

(51) Int. Cl.

| | |
|---|---|
| *F02C 3/32* | (2006.01) |
| *F02C 3/34* | (2006.01) |
| *F02C 6/08* | (2006.01) |
| *F02C 6/18* | (2006.01) |
| *F02C 9/18* | (2006.01) |
| *F01K 5/02* | (2006.01) |

(52) U.S. Cl.
CPC . *F02C 3/32* (2013.01); *F01K 5/02* (2013.01); *F02C 3/34* (2013.01); *F02C 6/08* (2013.01); *F02C 6/18* (2013.01); *F02C 9/18* (2013.01); *F05D 2220/31* (2013.01); *F05D 2220/3215* (2013.01); *F05D 2260/601* (2013.01); *Y02E 20/16* (2013.01)

(58) Field of Classification Search
CPC ............ F02C 3/32; F02C 3/34; F01K 5/02; F05D 2260/601; F05D 2270/05
See application file for complete search history.

(56) References Cited

U.S. PATENT DOCUMENTS

| | | | |
|---|---|---|---|
| 4,753,077 A | 6/1988 | Rosenblattz | |
| 6,385,958 B2 | 5/2002 | Leone et al. | |
| 6,393,825 B1 | 5/2002 | Leone et al. | |
| 9,169,782 B2 * | 10/2015 | Subramaniyan | F01D 5/187 |
| 2009/0056342 A1 | 3/2009 | Kirzhner | |
| 2009/0297339 A1 * | 12/2009 | Schott | F01D 9/02 415/148 |
| 2010/0175387 A1 | 7/2010 | Foust et al. | |
| 2010/0251727 A1 | 10/2010 | Myers et al. | |

* cited by examiner

*Primary Examiner* — Gregory Anderson
*Assistant Examiner* — Michael Sehn
(74) *Attorney, Agent, or Firm* — Nixon & Vanderhye P.C.

(57) ABSTRACT

Turbine airflow is modulated to improve performance during part load operation in a turbomachine. The turbomachine includes a compressor, a turbine with a plurality of stages, and a diffuser. Modulating the airflow includes extracting airflow from an upstream component of the turbomachine, admitting the extracted airflow into a rear stage of the plurality of stages. Admitting airflow into the rear stage serves to increase rear stage loading and alter an energy distribution in the rear stage during part load operation.

6 Claims, 4 Drawing Sheets

TURBINE FLOW MODULATION FOR PART LOAD PERFORMANCE

BACKGROUND OF THE INVENTION

The invention relates generally to turbomachines and, more particularly, to modulating gas or steam flow for improved part load performance.

During part load operation, gas and steam turbine rear stages operate under severe off-design conditions due to reduced flow and pressure ratios. The conditions result in efficiency losses.

It would be desirable to modulate turbine flow to stabilize the radial profile and other air flow properties in the turbine rear stages to increase efficiency during part load operation.

BRIEF DESCRIPTION OF THE INVENTION

In an exemplary embodiment, a method of modulating turbine airflow using exhaust gas recirculation improves performance during part load operation in a turbomachine. The turbomachine includes a compressor, a turbine with a plurality of stages, and a diffuser. The method includes the steps of (a) extracting airflow from an upstream component of the turbomachine; and (b) admitting the extracted airflow into a turbine rear stage of the plurality of stages, wherein step (b) is practiced to increase rear stage loading and alter an energy distribution in the rear stage during the part load operation.

In another exemplary embodiment, a turbomachine includes a compressor that pressurizes inlet air, a turbine with a plurality of stages that receives products of combustion to produce work, and a diffuser cooperable with the turbine. An extracting circuit is connected between an upstream component of the turbomachine and a rear stage of the plurality of stages, where the extracting circuit extracts airflow from the upstream component. An admitting circuit in fluid communication with the extraction circuit admits the extracted airflow into the rear stage of the plurality of stages, thereby increasing rear stage loading and altering an energy distribution in the rear stage during part load operation.

In yet another exemplary embodiment, a method of modulating a steam turbine for part load performance and operability provides for improved rear stage performance and exhaust hood performance. The steam turbine includes a high pressure (HP) section, a low pressure (LP) section with a plurality of stages and a low pressure exhaust hood or diffuser. The method includes the steps of extracting partial steam from the exhaust hood; utilizing steam from suitable upstream stages of the LP section as motive fluid with an ejector; admitting mixed flows extracted from the hood and the turbine stages in front of rear stages of the LP section to increase a stage pressure ratio, where the rear stage comes to design point operation. As a result of this, turbine exit velocity, and flow angles are corrected, which keeps the exhaust hood close to design point, resulting in improved pressure recovery.

DETAILED DESCRIPTION OF THE INVENTION

Figure 1:
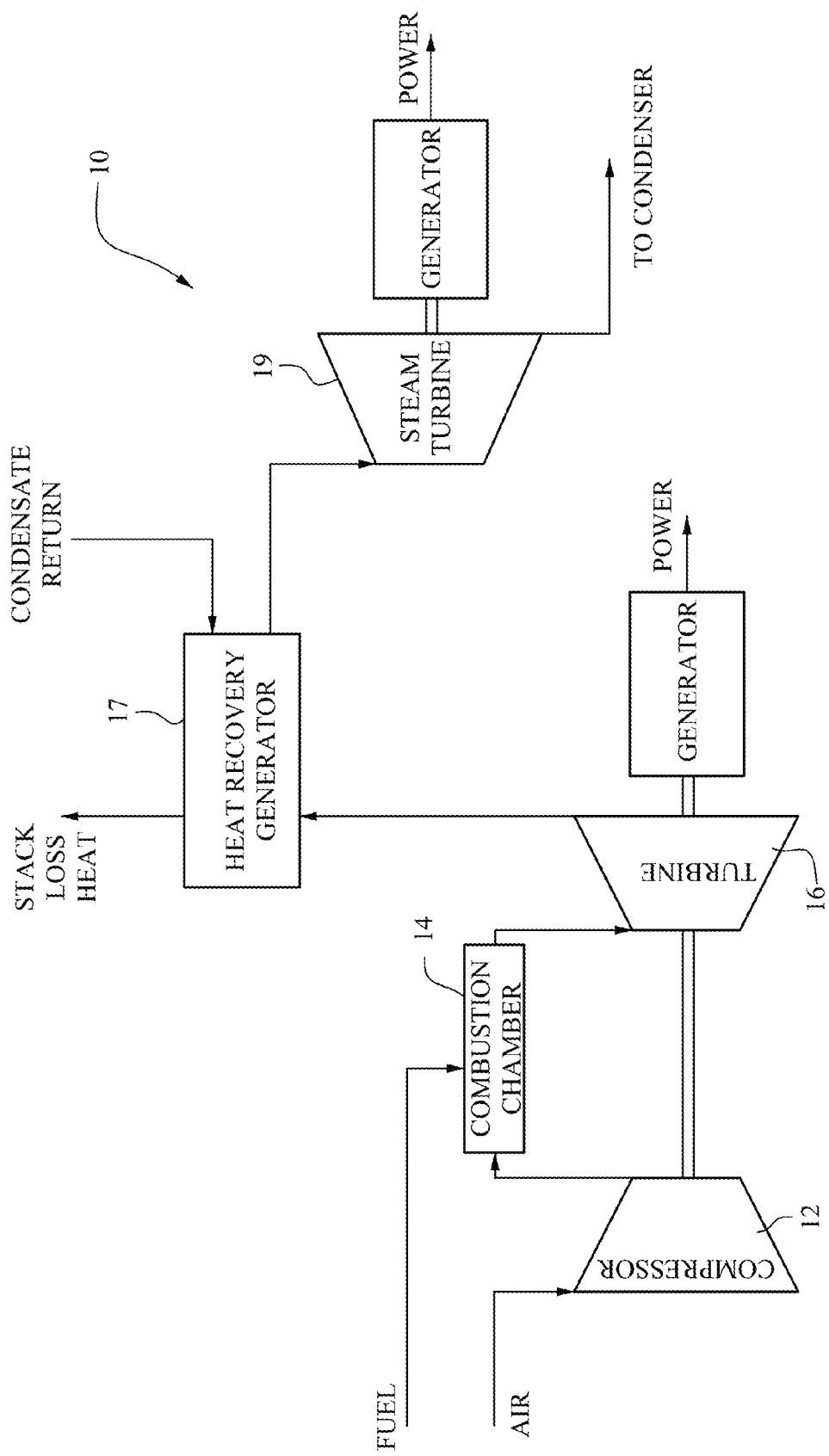
FIG. 1 is an exemplary schematic illustration of a typical combined cycle gas-steam turbine.

FIG. 1 illustrates a typical combined cycle gas-steam turbine 10. As shown, the gas turbine generally includes a compressor 12 at the front, one or more combustors 14 around the middle, and a turbine 16 at the rear. The turbine 16 includes a plurality of stages in separate turbine sections such as a low pressure (LP) section and a high pressure (HP) section. Some turbine designs also include an intermediate pressure (IP) section. The compressor 12 and the turbine 16 typically share a common rotor. In use, the compressor 12 pressurizes inlet air, which is then turned in direction or reverse flowed to the combustors 14 where it is used to cool the combustor and also to provide air to the combustion process. The combustors 14 inject fuel into the flow of compressed working fluid and ignite the mixture to produce combustion gases having a high temperature, pressure and velocity. The combustion gases exit the combustors 14 and flow to the turbine 16 where they expand to produce work. A diffuser 18 (FIG. 2) downstream of the turbine rear stage is cooperable with the turbine 16. Generally described, the diffuser converts the kinetic energy of the hot flow gases exiting the rear stage into potential energy in the form of increased static pressure. The diffuser directs the hot flow gases through a casing of increasing area in the direction of the flow.

The hot gases of combustion exhaust into a heat recovery steam generator 17 in which water is converted to steam. Steam thus produced drives a steam turbine 19, typically including high, intermediate and low pressure turbines, in which additional work is extracted.

Figure 2:
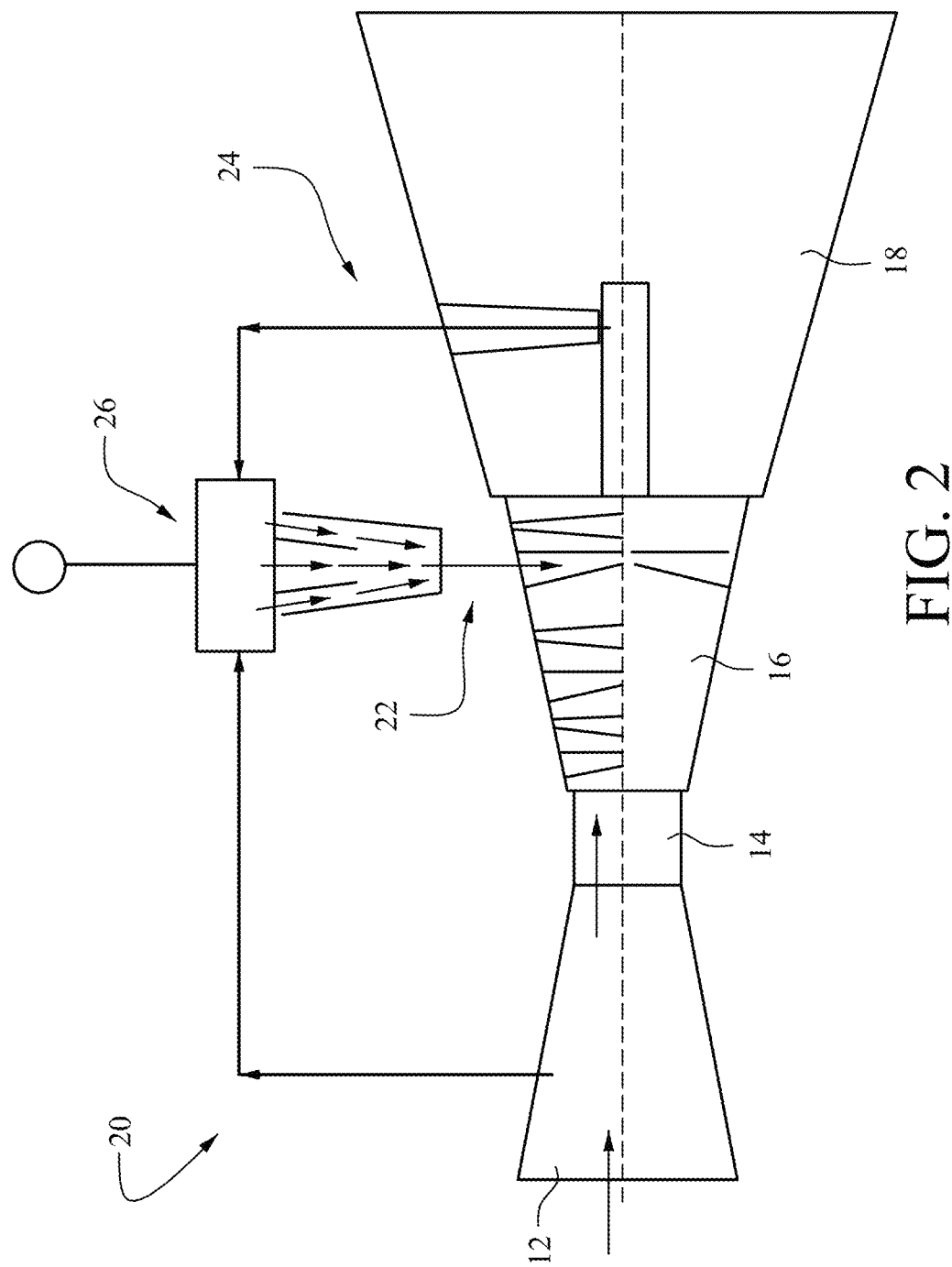
FIG. 2 is a schematic illustration of a gas turbine incorporating a flow modulating scheme of a first embodiment.
Figure 3:
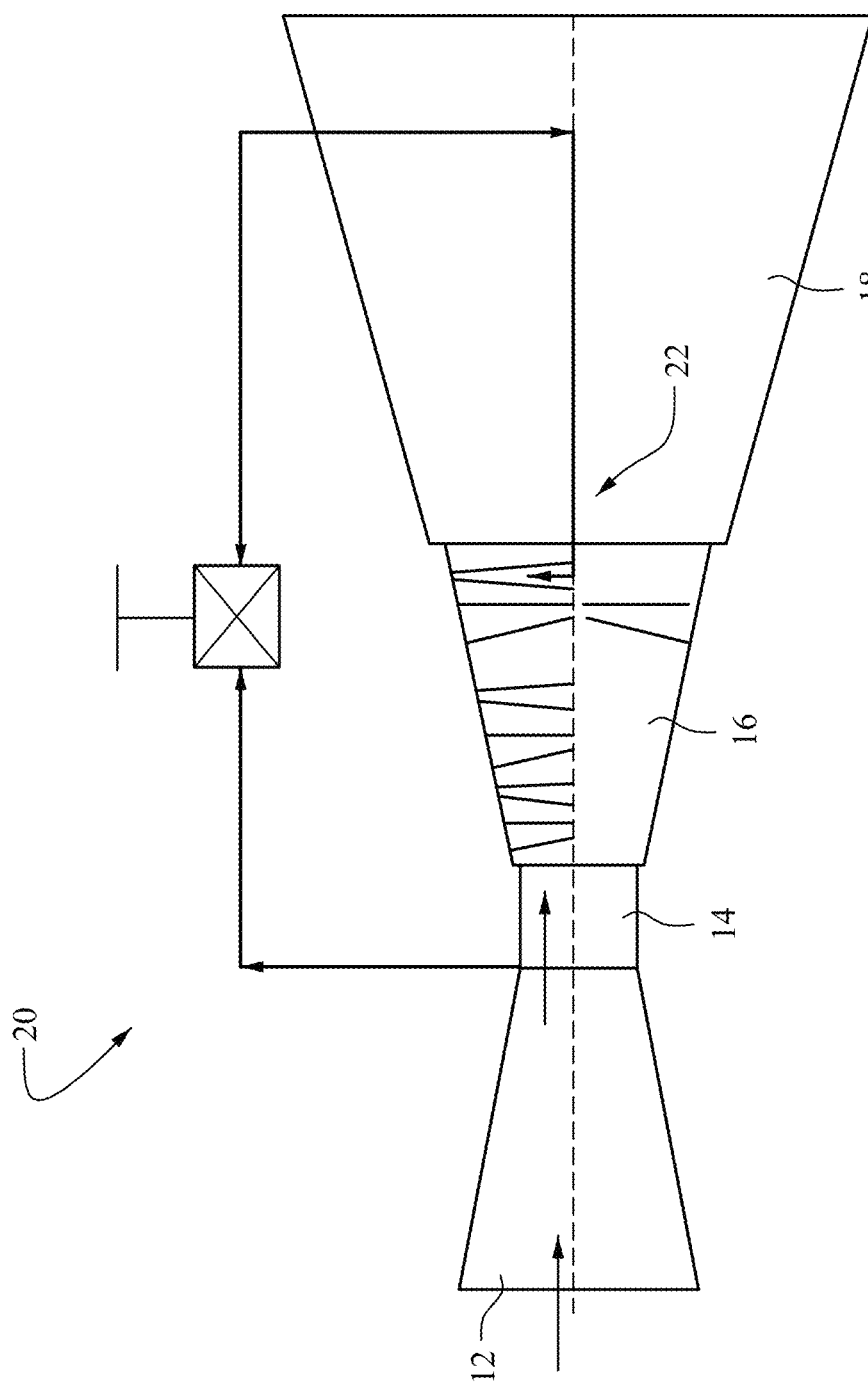
FIG. 3 is a schematic illustration of a gas turbine incorporating a flow modulating scheme of a second embodiment.
Figure 4:
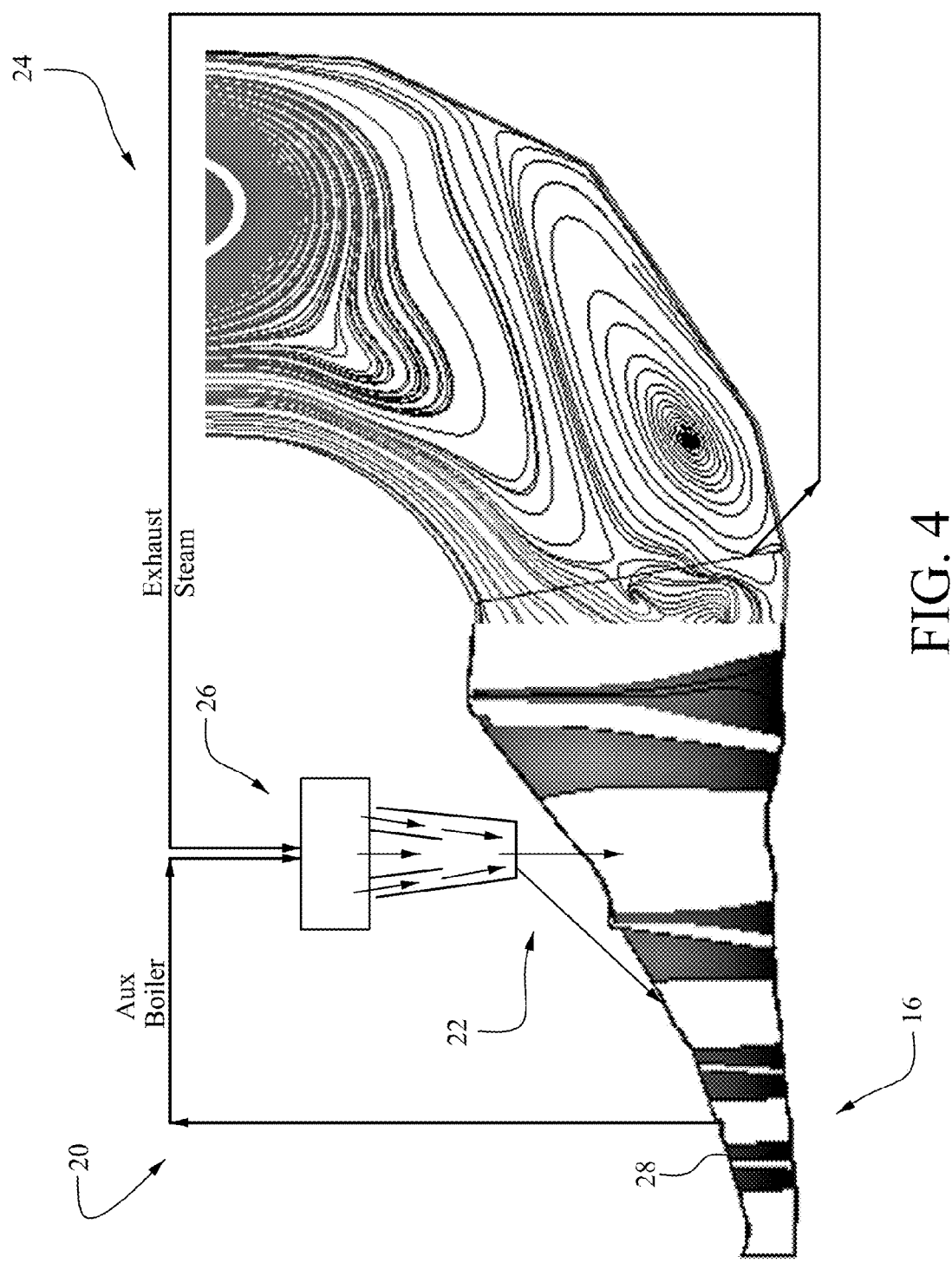
FIG. 4 is a schematic illustration of a steam turbine incorporating a flow modulating scheme of a third embodiment.

FIGS. 2-4 are schematic illustrations of alternative embodiments for turbine air/steam flow modulation for improved part load performance. In each embodiment, air/steam flow is extracted from an upstream component of the machine, and the extracted air/steam flow is admitted into a last stage (or downstream/rear stage) of the turbine stages. Admitting the extracted air/steam flow into the rear stage serves to increase rear stage pressure ratio or loading and alter an energy distribution in the rear stage during part load operation.

In the embodiment shown in FIG. 2, an extracting circuit 20 extracts air flow from the compressor 12. An admitting circuit 22 is in fluid communication with the extracting circuit 20 and admits the extracted air flow into the rear stage of the turbine 16. The extracting circuit 20 in FIG. 2 extracts air flow from a front stage of the compressor 12. An exhaust extraction circuit 24 is connected between the diffuser 18 and the admitting circuit 22. The exhaust extraction circuit 24 extracts exhaust gas from the diffuser 18. An ejector 26 is cooperable with the exhaust extraction circuit 24 and the admitting circuit 22. The ejector 26 mixes the extracted air flow via the extracting circuit 20 with the exhaust gas to form mixed flow. The admitting circuit 22 is positioned to admit the mixed flow into the turbine rear stage.

In the process, an inlet guide vane (IGV) to the compressor 12 is opened such that compressor inlet flow is increased. In an exemplary application, the compressor inlet flow is increased by 10%, and the extracting circuit 20 extracts air flow at 40 psi and 400° F. The exhaust extraction circuit 24 extracts exhaust gas to remove diffuser hub separation. Extraction or suction (fluidics) removes the separated flow and thus maximizes the effective area for better recovery. In one application, the exhaust extraction circuit 24 extracts 4% exhaust gas. A temperature of the exhaust gas is about 1200° F. In the ejector 26, the extracted air flow is mixed with the exhaust gas, and the mixed flow is admitted into the turbine rear stage. In the exemplary application, about 150 lbm/s mixed flow at about 800° F. is admitted to the rear stage.

The admission to the rear stage serves to unload upstream stages and increase rear stage loading. Increased rear stage loading corrects the swirl and a radial profile of the air flow during part load operation, resulting in more efficient operation.

FIG. 3 shows an alternative embodiment. The extracting circuit 20 extracts air flow from CDC (compressor discharge casing) air into the diffuser 18. The admitting circuit 22 admits the extracted flow into a trailing edge of the rear stage rotor blade. Admitting the flow to the trailing edge of the rear stage rotor blade serves to alter the blade throat area and thereby the energy distribution, thus improving efficiency and avoiding unsteady aero loads for better turbine operability.

FIG. 4 is a schematic illustration of a third embodiment according to the present invention. In this embodiment, the extracting circuit 20 extracts steam flow from the turbine LP section 28. The exhaust extraction circuit 24 draws turbine exhaust, and the extracted air flow and the turbine exhaust are mixed via an ejector 26 to form mixed flow. The mixed flow is admitted into the turbine last stage or rear stages via the admitting circuit 22. In an exemplary application, 5-10% LP inlet or front stages of turbine LP section exit flow is used to draw 5-10% of exhaust using the ejector 26. The mixed flow is admitted in the rear stage through a nozzle or casing to improve the rear stage and turbine performance. In the exemplary application, mixing 10 lbm of steam at 25 psi and 400° F. with 20 lbm steam at 1 psi and 100° F. gives a resulting temperature of 201° F., which is equal to rear stage conditions at design specifications. A dedicated auxiliary boiler (FIG. 4) can be utilized to supply high pressure steam to the ejector system as an alternate source to upstream stage flow to extract steam from the diffuser or exhaust hood.

The described embodiments endeavor to maintain flow conditions in the turbine rear stage close to design parameters during part load operation. Increasing rear stage air flow serves to unload upstream stages, resulting in increased output. Airfoil throat or minimal area is reduced as the turbine load or mass flow decreases in order to maintain suitable stage characteristics. This can be achieved either by having a variable device to reduce physical area or reduce the effective area via increasing the flow blockage. The latter is simpler and easier to achieve. The methodology maintains pressure ratios across the turbine stages and improves expansion characteristics across the air foils. By maintaining flow conditions at the rear stage close to design parameters, turbine efficiency can be improved during part load operation.

In related configurations of preferred embodiments, a method of modulating turbine airflow using exhaust gas recirculation improves performance during part load operation in a turbomachine. The turbomachine includes a compressor, a turbine with a plurality of stages, and a diffuser. The method includes the steps of (a) extracting airflow from suitable upstream stages of the compressor, (b) using the extracted air as motive fluid with an ejector to extract exhaust gas from suitable locations in the diffuser, and (c) admitting the mixed gas into the rear stages of the turbine or last stage in particular, and thereby increasing rear stage loading and altering the energy distribution of the turbine during part load operations.

Alternatively, a turbomachine includes a compressor that pressurizes inlet air, a turbine with a plurality of stages that receives products of combustion to produce work, and a diffuser cooperable with the turbine. An extracting circuit is connected between an upstream component of the turbomachine and a rear stage of the plurality of stages, where the extracting circuit extracts airflow from the upstream component. An admitting circuit in fluid communication with the extraction circuit admits the extracted airflow through a pressure side or trailing edge of the rear stage rotor blade and serves to alter the blade effective throat area of the rotor blade, thereby increasing rear stage loading and altering the energy distribution of the turbine during part load operations.

Alternatively, a method of modulating a steam turbine for part load performance and operability provides for improved rear stage performance and exhaust hood performance. The steam turbine includes a high pressure (HP) section, intermediate pressure (IP) section, and a low pressure (LP) section with a plurality of stages and a low pressure exhaust hood or diffuser. The method includes (a) extracting partial steam from inlet or suitable upstream stages of the LP section, (b) using the extracted steam as motive fluid with an ejector to extract exhaust steam from suitable locations in the hood or diffuser, and (c) admitting the mixed gas into the rear stages of the LP turbine or last stage in particular, and thereby increasing rear stage loading and altering the energy distribution of the turbine during part load operations.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of modulating turbine airflow during part load operation in a turbomachine using exhaust gas recirculation, the turbomachine including a compressor, a turbine with a plurality of stages, and a diffuser, the method comprising:
   (a) extracting airflow from an upstream component of the turbomachine; and
   (b) admitting the extracted airflow into a turbine rear stage of the plurality of stages, wherein step (b) is practiced to increase rear stage loading and alter an energy distribution in the rear stage during the part load operation, wherein the turbine includes a low pressure (LP) section and a high pressure (HP) section, and wherein step (a) is practiced by extracting airflow from the turbine LP section, drawing turbine exhaust, and mixing the extracted airflow with the turbine exhaust to form mixed flow, and wherein step (b) is practiced by admitting the mixed flow into the turbine rear stage.

2. A method according to claim 1, further comprising, prior to step (a), increasing compressor inlet flow, wherein step (a) is practiced by extracting airflow from a front stage of the compressor, the method further comprising, before step (b), increasing a temperature of the airflow extracted from the compressor.

3. A method according to claim 1, wherein step (b) is practiced by admitting about 150 lbm/s mixed gas at about 800° F.

4. A method according to claim 1, wherein the mixing step is practiced using an ejector.

5. A method according to claim 1, wherein step (a) is practiced by extracting 5% LP section non-marginal stage exit flow and drawing 10-15% turbine exhaust.

6. A method of modulating a steam turbine for part load performance and operability, the steam turbine including a high pressure (HP) section, a low pressure (LP) section with a plurality of stages and a low pressure exhaust hood or diffuser, the method comprising:
   extracting partial steam from the exhaust hood;
   utilizing steam from suitable upstream stages of the LP section as motive fluid with an ejector;
   admitting mixed flows extracted from the hood and the turbine stages in front of rear stages of the LP section to increase a stage pressure ratio, wherein the rear stage comes to design point operation.

* * * * *